US010723810B2

(12) United States Patent
Bastioli et al.

(10) Patent No.: US 10,723,810 B2
(45) Date of Patent: Jul. 28, 2020

(54) PROCESS FOR OBTAINING INULIN FROM ROOTS OF THE CARDOON PLANT

(71) Applicant: Novamont S.p.A., Novara (IT)

(72) Inventors: Catia Bastioli, Novara (IT); Luigi Capuzzi, Novara (IT); Giuseppina Carotenuto, Novara (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 15/547,919

(22) PCT Filed: Feb. 5, 2016

(86) PCT No.: PCT/EP2016/052500
§ 371 (c)(1),
(2) Date: Aug. 1, 2017

(87) PCT Pub. No.: WO2016/124738
PCT Pub. Date: Aug. 11, 2016

(65) Prior Publication Data
US 2018/0016358 A1  Jan. 18, 2018

(30) Foreign Application Priority Data
Feb. 5, 2015 (IT) .................. 102015000005539

(51) Int. Cl.
C08B 37/00 (2006.01)
(52) U.S. Cl.
CPC ...... *C08B 37/0003* (2013.01); *C08B 37/0054* (2013.01)

(58) Field of Classification Search
CPC .................. C08B 37/0003; C08B 37/0054
USPC ........................................... 426/50
See application file for complete search history.

(56) References Cited

U.S. PATENT DOCUMENTS

2002/0098272 A1   7/2002  Silver

FOREIGN PATENT DOCUMENTS

| EP | 2698387 A1 | 2/2014 |
|---|---|---|
| RU | 95112627 A | 10/1996 |
| WO | WO-2007/128560 A2 | 11/2007 |
| WO | WO-2008/068572 A2 | 6/2008 |
| WO | WO-2009/000535 A1 | 12/2008 |
| WO | WO-2009/077207 A2 | 6/2009 |
| WO | WO-2010/102806 A1 | 9/2010 |
| WO | WO-2012/074959 A1 | 6/2012 |

OTHER PUBLICATIONS

Noori WO. Selection of Optimal Conditions of Inulin Extraction from Jerusalem Artichoke (*Helianthus tuberosus* L.) Tubers by using Ultrasonic Water Bath. Journal of Engineering 20(10):110-119, Oct. 2014. (Year: 2014).*

* cited by examiner

*Primary Examiner* — Yih-Horng Shiao
(74) *Attorney, Agent, or Firm* — Polsinelli PC

(57) ABSTRACT

This invention relates to a new process for obtaining inulin from roots of cardoon plants, that is those belonging to the Cardueae tribe.

20 Claims, 1 Drawing Sheet

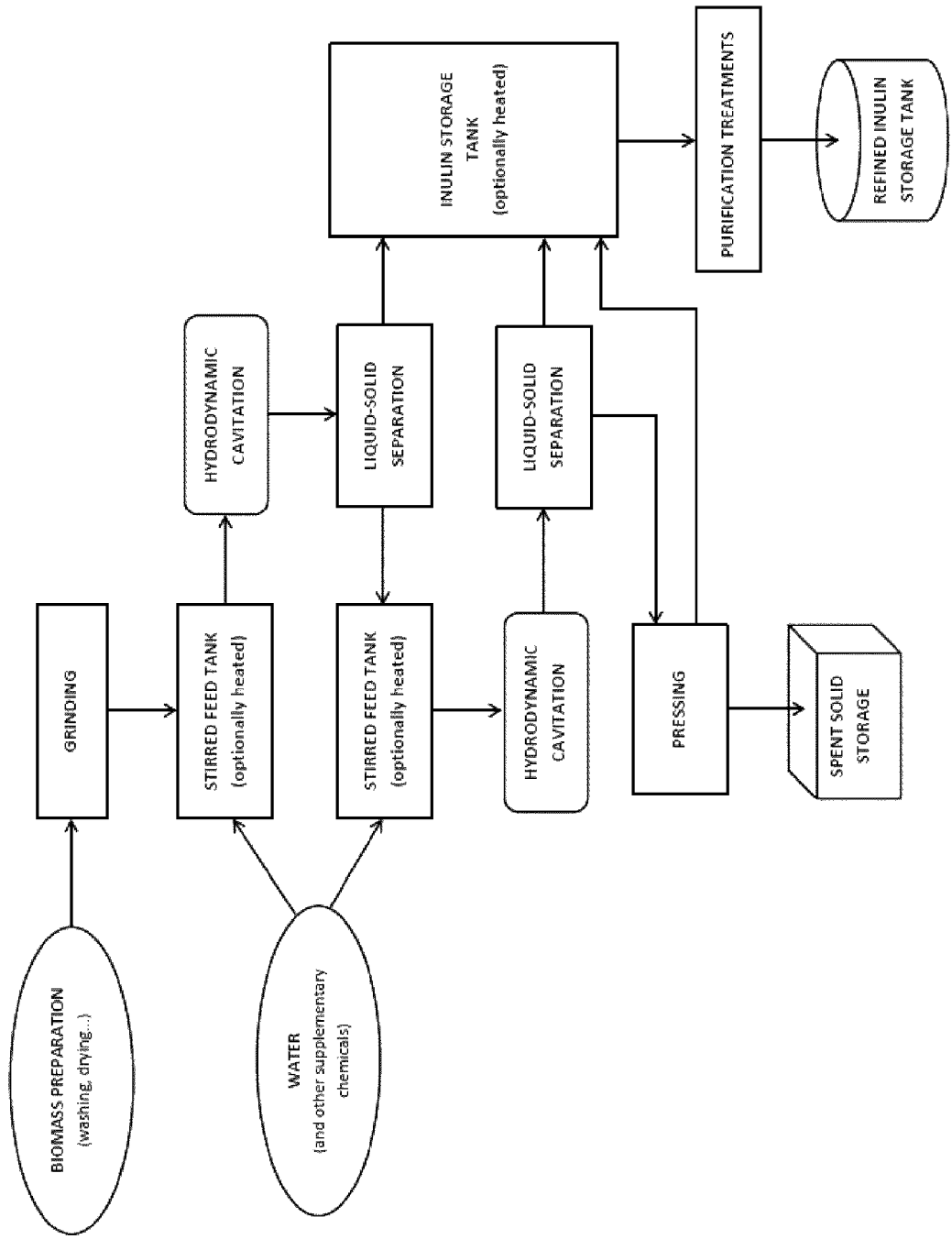

PROCESS FOR OBTAINING INULIN FROM ROOTS OF THE CARDOON PLANT

CROSS REFERENCE TO RELATED APPLICATIONS

This application is a National Phase filing under 35 U.S.C. § 371 of PCT/EP2016/052500 filed on Feb. 5, 2016; and this application claims priority to application Ser. No. 10/2015000005539 filed in Italy on Feb. 5, 2015 under 35 U.S.C. § 119. The entire contents of each application are hereby incorporated by reference.

This invention relates to a new process for obtaining inulin from the roots of cardoon plants, which belong to the Cardueae tribe.

Inulin is a linear polysaccharide mainly comprising molecules of D-fructose which is held as a reserve substance, like starch, in many plant species including those belonging to the Asteraceae family, such as for example Jerusalem artichokes (*Helianthus tuberosus*), chicory (*Cichorium intibus*) and plants of the Cardueae tribe, such as in particular those of the species *Cynara cardunculus*.

Inulin finds application in many fields such as for example in the food industry as a sweetener or as a substitute for fats and flours, in the production of ethanol, in the medical sector, where it is for example used for the measurement of kidney function, in the treatment of intestinal disturbances and as a coadjuvant for vaccines. Given its renewable origin and its potentially extensive availability inulin is a useful starting material for the chemical industry, in particular when considered a possible raw material for the production of HMF and 2,5-furandicarboxylic acid.

At present inulin is mainly obtained from chicory roots, from which it is extracted by mixing the dry ground roots with water and subsequently filtering and/or centrifuging the aqueous solution obtained, which is rich in inulin.

The growing interest shown by the chemical industry in inulin as a possible raw material means that other sources which are capable of ensuring greater availability and a lower cost must be identified.

Of the various plant species in which it is present, roots of plants belonging to the Cardueae tribe, especially those cultivated according to the method described in Italian Patent Application no. 102015000005531 and in international application no. PCT/EP2016/052487, are a promising source of inulin because of their ability to grow even in arid ground, virtually without the need for significant fertilising treatments, while at the same time ensuring high production yields. Although the roots of the said plants belonging to the Cardueae tribe contain significant quantities of inulin, an industrial process for extracting it from these efficiently, economically and with a low environmental impact has not yet been developed.

There is therefore a need to find a new process that is capable of obtaining inulin from the roots of plants belonging to the Cardueae tribe which meets this requirement. Starting from this technical problem it has now surprisingly been discovered that it is possible to extract significant quantities of inulin from the roots of plants belonging to the Cardueae tribe by means of a process comprising the steps of:
   a) comminuting the roots in order to obtain cossettes having a maximum thickness of 1 cm;
   b) leaching by means of at least one cavitation treatment the inulin from the said cossettes in presence of an aqueous solution;
   c) separating an aqueous phase containing inulin and a solid phase containing the spent cossettes from step b);
   d) purifying the said aqueous phase containing inulin.

In particular the process according to this invention makes it possible to obtain inulin from the roots of plants belonging to the Cardueae tribe in high yield, thus making this polysaccharide available for subsequent applications. Thanks to the flexibility of the method according to this invention it is also possible to alter the quality, concentration and purity of the inulin obtained so that it can be most appropriately adapted to the needs of subsequent uses. The process according to this invention is particularly suitable for extracting inulin from the roots of plants having a high inulin content, preferably of between 35 and 60% by weight with respect to the total dry weight of the roots.

The process according to this invention starts from the roots of plants belonging to the Cardueae tribe, preferably roots of plants belonging to the species *Cynara cardunculus*, which have the advantage that they are able to grow in arid climates and even in poorly favourable climatic conditions.

The said plants, in particular those pluriennial plants cultivated according to the method described in Italian Patent Application no. 102015000005531 and in international application no. PCT/EP2016/052487, also have the further advantage that they contain high quantities of inulin with respect to both the total weight of the roots and the total weight of the plant, thus helping to render their use for obtaining inulin even more advantageous.

As mentioned above, the use of plants belonging to the Cardueae tribe as a source of supply has the advantage that the latter are plants which are generally capable of growing in arid ground even under unfavourable climatic conditions. This, and also depending upon the cultivation conditions adopted, brings about the growth of particularly extensive large roots which penetrate the ground to depths of more than even 2 metres. Also, inulin is mainly accumulated by the plants in the central and shallow part of the roots, thus making it advantageous in the case of particularly extensive and large roots to harvest only the said central shallow part of the roots, largely corresponding to approximately 60% by weight with respect to the total weight of the root.

In the meaning of this invention, by feedstock roots are therefore meant either the entire body of the root of the plant or portions of 60% or more by weight with respect to the total weight of the said entire root body. In a preferred embodiment root portions of 60% or more by weight with respect to the total weight of the whole root body are fed to step a) of the process according to this invention.

Before being fed to step a) of the process according to this invention the roots advantageously undergo one or more preliminary treatments which are suitable for preparing them for comminution. At the time when the roots are harvested and transported, they may in fact be contaminated by foreign bodies which may be of various kinds, such as for example biomass residues, typically leaves, stalks or stems, stones, earth and ferrous residues originating for example from the equipment used in harvesting. The said roots may also contain an excessive moisture content, which may influence subsequent comminution step a) in the process, depending upon the operating procedures used. The process according to this invention therefore preferably comprises one or more preliminary steps prior to step a) selected from:
   (i) topping;
   (ii) cleaning and screening;
   (iii) washing;
   (iv) drying.

These preliminary steps may be combined together in different ways, also depending upon the method by which the roots are harvested and transported. According to a preferred aspect of this invention, the process comprises one or more of the said preliminary steps, preferably in the order indicated above. The said steps may be carried out using different items of equipment or a single item of equipment, or in different parts of the same item of equipment. For simplicity of description reference will be made in the rest of the application to operations referring to equipment capable of carrying out the individual steps, with it nevertheless being understood that this will also include processing in a single item of equipment or in different parts of the same item of equipment.

The preliminary step of topping (i) is in particular intended to separate out any biomass residues, such as for example leaves, stalks or stems, which are still attached to the roots. The said topping step may be performed using equipment for mechanically removing the residues such as for example cutters.

The step of cleaning and screening the roots (ii) is typically performed by passing the seeds through vibrating screens, aspiration or electromagnetic systems and makes it possible to perform the operations of degreening (removal of other plants and biomass residues discharged together with the roots), destoning (removal of stones, pebbles and earth) and removing ferrous residues originating for example from the equipment used during harvesting.

The washing step (iii) makes it possible to remove greens, biomass residues, stones, pebbles and earth and other residues which may not have been completely removed by means of other treatments, such as for example the step of cleaning and screening the roots (ii), with which it is advantageously associated or replaces. Preferably, the said washing step is carried out using water at temperatures of 50° C. or below so as to minimise the dissolution and consequent loss of inulin during this step. Advantageously washing may be carried out by immersing the roots or making them pass under water jets.

The drying step (iv) makes it possible to control the water content of the roots. This has the aim of on the one hand limiting phenomena which degrade the roots, thus offering a possible longer storage period, and on the other hand contributing to the satisfactory result of subsequent step (a); for example too low a water content may result in excessive fragmentation of the cossettes, with the consequent formation of dusts.

The drying step is typically performed in equipment known as dryers, which may be of the vertical or horizontal type with rotating cylinders. Drying takes place by placing the roots in contact with a hot flow of gas, generally air, maintained at a humidity content below the saturation point at the temperature of use. Preferably drying is carried out using dry air at temperatures of 90° C. or below, preferably 80° C. or below, more preferably 50° C. or above.

The roots which are fed to step (a) of the process according to this invention advantageously have a water content of 3 to 55% by weight, preferably 15-50% by weight, more preferably 20-40%. The said water content is determined using methods of analysis known to those skilled in the art.

The roots are then fed to step a) of the process according to this invention which causes them to be comminuted in order to produce cossettes having a maximum thickness of 1 cm, preferably 0.5 cm or less, and more preferably between 0.5 and 2 mm, so as to allow the subsequent step of leaching to be performed. In the meaning of this invention, by the term comminution is meant any treatment which subdivides and reduces the roots into smaller cossettes, such as for example cutting, chopping, slicing, shearing, fragmenting, flaking, grinding or mincing the roots. The cossettes obtained through the comminuting operation have a greater surface area for subsequent leaching step b), increasing the efficiency and rate of extraction of inulin from the roots by the aqueous solution. In the meaning of this invention, the term cossettes means portions of roots such as for example particles, shavings, pieces, fragments, flakes or cossettes of any shape which can be obtained through a comminuting operation.

Step a) of the process according to this invention may be carried out in any equipment which is suitable for subdividing and reducing the roots of plants belonging to the Cardueae tribe to pieces, such as for example cutting tools and impact tools, for example the cutters commonly used for sugar beet, root chopping machines, hammer mills, roller mills, blade mills or flakers. The comminuting operation is preferably carried out at a temperature of 90° C. or below, more preferably 80° C. or below and even more preferably 70° C. or above so as to limit heat stress and reduce any phenomena degrading the inulin in the roots Preferably, at the end of step a) the cossettes are pasteurized in order to deactiveate inulin-degrading enzymes (e.g. inulinases), in order to avoid undesired degradation of inulin before leaching. Such a pasteurization treatment may be also performed before step a), on the roots before comminution.

After step a) the process according to this invention provides for step b) of leaching, by means of at least one cavitation treatment, inulin from the cossettes in presence of an aqueous solution. Said step b) may be carried out in any equipment suitable for the purpose (known as "cavitators"), for example hydrodynamic cavitators, ultrasonic cavitators as well as static cavitators of both the batch or continuous type, and of both the co-current and counter-current type. Typical examples of commercially available cavitators suitable for use in step b) of the process according to this invention are SPR (Shockwave Power Reactor) and Biopush cavitators. In a preferred embodiment of the present invention, step b) of the process according to this invention is performed by means of at least one hydrodynamic cavitation treatment. Alternatively, step b) can be performed by means of an ultrasonic extraction.

In addition, step b) of process according to the present invention can also comprise one or more inulin leaching treatments in presence of aqueous solutions, for example using one or more "diffusers", for example batch reactors or continuous remixing reactors, solid-liquid extractors, of both the co-current and counter-current types, operating on a continuous or batch cycle, and which may be horizontal or vertical, or immersion tanks fitted with modular conveyor belts. Typical examples of commercially available equipment suitable for use in step b) of the process according to this invention are "RT" horizontal rotor extractors, DDS inclined rotating screw extractors and vertical rotating towers.

In an embodiment of the process according to the present invention, step b) is carried out also by combining one or more cavitation treatments with one or more treatments with diffusers as disclosed in the present application.

In order to maximise intimate contact between the cossettes and the aqueous solution said step b) is advantageously carried out in one or more cavitators, which may also be arranged in groups or in sequences depending upon the desired process configuration. For example step b) of the process according to this invention may be carried out using a single cavitator or two or more cavitator placed in series. Where not explicitly described otherwise, when reference is made in this invention to a treatment carried out in a cavitator this is intended to include process configurations which comprise two or more cavitators arranged in series.

Where the process according to this invention is carried out in continuous mode, step b) may also be carried out using two or more cavitators, preferably two or more hydrodynamic cavitators of the types described above which can work simultaneously or alternately, in series or in parallel, thus making it possible to shut down one of the cavitators without interrupting the process.

The said leaching operation may be carried out by feeding the cossettes at ambient temperature, or in order to assist inulin extraction by preheating them, preferably in water, to temperatures of 90° C. or below, more preferably 80° C. or below, and even more preferably 30° C. or above, more preferably 40° C. or above, even more preferably 70° C. or above before they enter the cavitator for a time which is preferably of 5 minutes or less. By opening the plant cells the increased temperature makes it possible to aid passage of the inulin into the liquid phase, thus maximising the yield from step b) and at the same time avoiding excessive stress on the cossettes, thus limiting any phenomena degrading the inulin. With the same object of increasing the yield from leaching step b) in the process according to this invention the step is preferably performed at temperatures of 90° C. or below, more preferably 80° C. or below, and even more preferably 30° C. or above, more preferably 40° C. or above, even more preferably 70° C. or above. In this case temperature control during step b) is carried out for example by preheating the aqueous solution (which leaches inulin from the roots) and/or using cavitators provided with temperature control systems. The use of temperatures within the ranges indicated above during step b) of the process according to this invention also has the further advantage of reducing the viscosity of the aqueous solution, thus helping to ease pumping, and increasing the solubility of inulin in the aqueous solution. In order to increase the yield from leaching of the cossettes, before step b) and after the preheating step or during step b) they may also be pressed at pressures of preferably 5 kg/cm$^2$ or less, for example by means of roller presses or calenders.

In addition to not providing further benefits for process yield, leaching temperatures higher than those indicated above would increase its cost and could give rise to the formation of undesired by-products as a result of phenomena degrading the inulin and other components of the cossettes.

The at least one cavitation treatment in step b) of the process according to the present invention is preferably performed at a pressure in the range of 1-35 bar, preferably of 1-18 bar.

The at least one cavitation treatment in step b) of the process according to the present invention is carried out preferably for a time of less than 60 minutes, more preferably in the range of 5-40 minutes.

In a preferred embodiment, step b) of the process according to this invention is carried out by means of at least one cavitation treatment performed at temperatures in the range of 30-90° C. preferably of 40° C.-80° C., even more preferably of 70-80° C., at pressures in the range of 1-35 bar and preferably for a time of less than 60 minutes, more preferably in the range of 5-40 minutes.

As far as the aqueous solution which is to be used in step b) of the process according to this invention is concerned, in addition to water this may contain disinfecting agents (to inhibit the action of any bacteria which would deteriorate the inulin), such as for example hydrogen peroxide, sulfur dioxide, active chlorine, ammonium bisulfate, fermentation inhibiters, acids or bases to control pH, inorganic salts to alter the ionic strength of the solution, and surfactants in order possibly to improve the wettability of the cossettes. In a preferred embodiment the aqueous solution is characterised by a pH in the range between 5 and 9, preferably between 6 and 8.

In the process according to this invention step b) is preferably carried out using up to 15 parts by weight of an aqueous solution per part of dry cossettes, more preferably from 12 to 2 parts by weight of aqueous solution per part of dry cossettes, and more preferably from 10 to 3 parts by weight of aqueous solution per part of dry cossettes.

In a particularly preferred embodiment of the process according to this invention step b) is preferably carried out by treating the cossettes with at least one cavitation treatment in cavitation treatment at temperatures in the range of 30-90° C. preferably of 40° C.-80° C., even more preferably of 70-80° C., at pressures in the range of 1-35 bar and preferably for a time of less than 60 minutes, more preferably in the range of 5-40 minutes, more preferably in a hydrodynamic cavitator using up to 15 parts by weight of aqueous solution per part of dry cossettes, more preferably from 12 to 2 parts by weight of aqueous solution per part of dry cossettes, and more preferably from 10 to 3 parts by weight of aqueous solution per part of dry cossettes, thus obtaining an inulin leaching yield with respect to the total inulin present in the roots fed to the process which is more than 90% by weight, and preferably 94% by weight or more.

Inulin leaching yield may be determined according to any one of the methods known to the skilled person on this purpose, for example by determining inulin content on the aqueous phase obtained at the end of step b).

Preferably, high pressure liquid chromatograph (HPLC) equipped with refractive index (RI) detector is used for determining inulin content. For example a sample obtained in step b), is treated, for example by filtration or any other suitable treatment for obtaining an aqueous phase, and then concentrated and weighed. A sample of this mixture (1 mg) is dissolved in a of 0.9 ml of 0.005N H2SO4 and 0.1 mL of DMSO solution, filtered (filter pore diameter: 0.20 µm) and then analysed by HPLC after calibration using a reference standard.

After leaching step b), the process according to this invention provides for step c) in order to separate out the aqueous phase containing inulin from the solid phase containing the spent cossettes. In the meaning of this invention by solid phase is also meant suspensions, sludges (known as "slurry") and any fraction having a sufficiently high density to separate out from a supernatant.

Step c) of the process according to this invention may be carried out according to any means known to those skilled in the art to separate a solid phase from a liquid phase, for example by filtering, centrifuging, sedimentation, settling, pressing, crushing or using any combination of these methods. The said separation may be performed in equipment other than that in which step b) is performed, or in the same equipment. For example, when step b) of the process is carried out in a continuous hydrodynamic cavitator separation of the aqueous phase containing inulin from the solid phase containing the spent cossettes typically takes place at the end of the cavitator, for example using a centrifugal decanter which discharges the solid phase separating out and allows the aqueous phase to flow away.

The aqueous phase separated during step c) of the process according to this invention has an inulin content which, depending among other things on the initial quantity of inulin in the roots and the quantity of water used in the leaching step, typically lies between 3 and 20%, preferably up to 18% by weight, in ideal conditions preferably between 6 and 12% by weight of inulin, while the solid phase containing the spent cossettes also has a water content of 70% or less, preferably 60% by weight or less.

In order to avoid precipitation of the inulin from the aqueous solutions present during the various steps of the process according to this invention the said aqueous solutions are advantageously heated and held at a temperature of or greater than the temperature at which the concentration of inulin present is below its solubility at that temperature.

In order to maximise yield from the process the solid phase separated out during step c) is preferably treated to recover at least some of the water and inulin present in it. This may be subjected to a step of mechanical pressing, which is advantageously carried out using one or more presses of various kinds, which are preferably continuous. The said operation may be performed by feeding the solid phase at ambient temperature, or in order to facilitate the recovery of water and inulin, by preheating the said solid phase to temperatures preferably of 90° C. or below, more preferably 80° C. or below, and even more preferably 30° C. or above, more preferably 40° C. or above, even more preferably 70° C. or above. The increase in pressure generated during this step may give rise to an increase in internal temperature. The presses may therefore be provided with cooling systems preventing an excessive temperature rise which could have an adverse effect on the quality of the inulin.

In a preferred embodiment of this invention, at the end of the said pressing step the solid phase from which at least part of the water and inulin has been recovered has a water content of 50% or less, more preferably 40% by weight or less.

In order to increase the yield of the inulin leaching from the cossettes, step b) and step c) of the process according to the present invention are preferably performed more than once, by at least partially recycling the output of a first cavitation treatment to at least a second cavitation treatment, preferably performed on the same equipment in which the first leaching treatment has been performed, optionally subjecting it to an intermediate separation of the aqueous phase containing inulin from the solid phase containing the spent cossettes, and advantageously adding new aqueous solution in order to restore, during the second cavitation treatment, the selected amount of parts by weight of aqueous solution per part of dry cossettes.

In a further embodiment a portion of the solid phase obtained at the end of step c) of the process according to the present invention is preferably recycled to step b) for being newly subjected to a cavitation treatment, advantageously being mixed with a fresh stream of cossettes.

In such a configuration, for example the first leaching treatment can be performed combining at least one cavitation treatment with leaching treatments by means of diffusers, or by combining two cavitation treatments.

The solid phase obtained at the end of step c) of the process according to this invention, which may or may not have undergone the pressing operation described above, may then be used for various purposes, such as preferably energy recovery through combustion, the production of biogas, the production of animal feeds, or the production of organic compounds. In a preferred embodiment of this invention the said solid phase is sent to a pre-treatment process for obtaining a multiplicity of organic compounds such as sugars and lignins. The technologies may be steam explosion technologies with or without washing pretreatments in acid, basic or neutral environments, such as for example those described in patent application WO 2010/113129, WO 2012/042497 and WO 2012/042545 or processes in an alkaline environment such as for example those described in steps b) to d) of Italian patent application NO2012A000002 or patent application WO2013/139839. The liquid phase separated from the solid phase by the pressing operation obtained at the end of step c) also contains dissolved inulin and is preferably pooled with the aqueous phase separated from step c) for subsequent step d) of the process according to this invention.

In step d) of the process according to this invention the aqueous phase containing inulin undergoes one or more purification treatments. Depending upon the final use for which the inulin is intended the said purification treatments are preferably selected from the group comprising: concentration by evaporation of some of the water present, carbonatation treatment, treatment with an aqueous solution of $Ca(OH)_2$ (fining) preferably followed by carbonatation, crystallisation, centrifuging, filtration, microfiltration, nanofiltration, ultrafiltration, lyophilisation, osmosis, settling, refining or any technique which is suitable for separating a solid from a liquid and combinations thereof. These purification treatments may be combined together in various ways which also depend on the quality of the inulin and manner in which it is desired to obtain it for subsequent uses. According to a preferred aspect of this invention the process comprises one or more of the said purification treatments, more preferably selected from the group comprising concentration through evaporation of some of the water, filtration, microfiltration, nanofiltration, ultrafiltration and osmosis.

As far as concentration through the evaporation of water is concerned, this is preferably carried out under conditions such as not to degrade and/or hydrolyse the inulin present. In a preferred embodiment the said concentration is carried out by multistep evaporation, which may be co-current or counter-current, with a number of steps equal to 3 or more, preferably between 4 and 6. Preferably the multiple step evaporation treatments are carried out co-currently, so as to limit the formation of by-products.

As far as treatment with an aqueous solution of $Ca(OH)_2$, also known as fining, is concerned, this has the object of eliminating foreign substances (non-sugars) before the subsequent steps of processing. In the said treatment, the aqueous phase is mixed with the aqueous solution of $Ca(OH)_2$ (also known as milk of lime), which may bring about decomposition of the nitrogen-containing bases present with the consequent release of gaseous $NH_3$ and also the precipitation, typically in colloidal form, of many impurities such as for example sulphate, phosphate, citrate or oxalate anions, which precipitate out as their corresponding calcium salts, and organic substances such as proteins, saponins and pectins. Preferably, when it is carried out, fining is carried out at a pH of 10 or more, more preferably at pH 10-11.5, and at temperatures of 90° C. or below, more preferably 85° C. or below, and even more preferably 30° C. or above, more preferably 40° C. or above, even more preferably 70° C. or above. In a preferred embodiment of the present invention, such a treatment is performed using calcium hydroxide at 0.2% for extracted material or 0.4% calcium oxide equivalent for pressed juice.

On completion of the fining treatment, a sludge is obtained comprising precipitates and colloids and an aqueous phase containing inulin which is subsequently separated off, preferably by filtration. In order to facilitate filtration after fining, a carbonatation treatment is preferably performed by injecting a gas rich in $CO_2$, preferably by bubbling, which causes precipitation of the milk of lime (forming $CaCO_{3(s)}$) which in turn thickens the sludge. The said carbonatation step is carried out in such a way as to keep the pH at low values, preferably 9 or above. Once carbonatation has been performed the solid phase is separated out from the liquid phase containing the inulin. This separation may be performed using any one of the means known to those skilled in the art to separate a solid phase from a liquid phase, for example by means of filtering, centrifuging, sedimentation, settling or using any combination of these methods.

The by-products obtained during the said purification treatments, such as for example the solid phase separated out during fining, may be further treated to recover any inulin which is still present therein, preferably by recycling them in suitable steps of this process, or they may in turn be used to recover other components or as secondary products of the process.

In a preferred embodiment, at the end of the process according to this invention the inulin is in the form of a saturated aqueous solution obtained by at least one treatment of evaporation of some of the water present in the aqueous phase at the end of step c) of the process. In this way the inulin may be directly used as a raw material for subsequent reactions for the synthesis of monomers and added value chemical intermediates such as for example HMF, 2,5-furandicarboxylic acid, as is or converted into fructose through chemical or enzyme hydrolysis. Alternatively, and according to the need for storage and subsequent use, the inulin may be recovered by precipitation, typically by reducing the temperature and subsequently separating out the solid from the mother liquors according to any of the methods known for the purpose to those skilled in the art.

Depending on the final use of the inulin obtained by the process according to the present invention, further purification and fractionation treatment may be performed.

The resulting inulin can be indeed treated with cation and anion exchanger resins to demineralize and decolorize it, thus removing the secondary metabolites. Chromatographic fractionation by size exclusion generally yields two fractions: short-chain fructooli-gosaccharides with mono- and disaccharides, and a high-dp fraction. Fractionation may also be achieved using low temperature or ethanol precipitation of the high molecular weight fraction or using ultra- and nanofiltration. The clarified syrup may be then further concentrated in a suitable apparatus for example at 90° C. and from 600 to 50 mbar and the inulin can then be newly precipitated by using 10% vol of ethanol respect to extracted solution.

FIG. 1 shows a preferred embodiment of the process according to the present invention comprising one or more pretreatment steps, a comminuting step (step a)), two cavitation treatments (step (b)) interspersed by one intermediate partial separation (step c)), one final separation step (step c)) of the aqueous phase containing inulin from the solid phase containing the spent cossettes, and one purification step (step d)).

The invention will now be illustrated through examples which are intended to be for illustrative purposes and does not restrict the invention.

EXAMPLES

HPLC-RI Method for Inulin Analysis

HPLC analysis was performed on a chromatograph equipped with RI detector and a Rezex ROA-Organic acid H+ (8%) 300×7.8 mm column. A 0.005N H2SO4 solution at a flow rate of 0.6 mL/min was used as mobile phase. The column temperature was set at 65° C.

Example 1

Comparative 10 kg of roots of *Cynara cardunculus* which had first been cleaned and dried to contain 16% by weight of water, containing 40% by weight of inulin (with respect to the total wet weight) were fed at 25° C. into a CUMBERLAND blade mill (model 812, 4 kW) operating at 1450 rpm, obtaining cossettes having a thickness of approximately 1.5 mm.

The said cossettes were fed to a remixing batch reactor containing 57 litres of water (pH approximately 7) preheated to 80° C. The system was kept stirred (40 rpm) and was thermostatted to 70° C. for a time of 1 hour, obtaining an inulin leaching yield with respect to the total content of inulin present in the roots of 94% by weight (determined by HPLC on a portion of the aqueous solution obtained by separating out the aqueous solution from the unpressed cossettes by centrifuging) at the end of the said treatment.

The cossettes and the leaching aqueous solution were separated (at a temperature of 70° C.) using a NUOVA SARA basket centrifuge (28 litre Edy Minor model) (diameter 350 mm) operating at 1400 rpm to separate out 51.5 kg of aqueous phase and 15.5 kg of solid phase (spent cossettes).

The solid phase, still containing 5.8% of inulin and 65.8% of water, was washed with 4 kg of water and then pressed at 80° C. and 5 kg/cm² using a grape seed press yielding 9.8 kg of aqueous phase containing 4.4% of inulin, which was pooled with the aqueous phase separated out at the end of the leaching for subsequent purification, and 9.7 kg of the pressed solid phase containing 50% of water and negligible traces of residual inulin.

A portion of 5.7 kg of the aqueous phase originating from the leaching step held at 65° C. and containing 5.8% by weight of inulin was then filtered on a paper filter to remove suspended solid impurities. The filtrate so obtained was then concentrated by evaporation under vacuum (T=90° C., pressure=450 mbar progressively reduced to 150 mbar) in a Rotovapor until 80% by weight of the water had been removed. The concentrated solution so obtained was then subsequently crystallised recovering approximately 00.316 kg of inulin, corresponding to a total process yield of inulin with respect to the total inulin present in the roots of 85%.

Example 2

6.3 kg of roots of *Cynara cardunculus* which had first been cleaned and dried to contain 6% by weight of water, containing 38.4% by weight of inulin (with respect to the total wet weight) were fed at 25° C. into a CUMBERLAND blade mill (model 812, 4 kW) operating at 1450 rpm, obtaining cossettes having a thickness of approximately 1.5 mm.

The said cossettes were gradually fed to a stirred tank (10 rpm) containing 20 litres of water (pH approximately 7). The solution was pumped by a lobe pump into a cavitation reactor (SPR technology, 3 m³/h, 1-3 barg, 37 kW) (operating conditions 0.5 m³/h, 1-3 bar) and then recycled for a time of 46 minutes. The roots in water reached the final concentration of 23.9% wt after 28 minutes, obtaining an inulin leaching yield with respect to the total content of inulin present in the roots of 97.9% by weight (determined by HPLC on a portion of the aqueous solution obtained by separating out the aqueous solution from the unpressed cossettes by centrifuging) at the end of the said treatment.

The cossettes and the leaching aqueous solution were separated (at a temperature of 70° C.) using a NUOVA SARA basket centrifuge (28 litre Edy Minor model) (diameter 350 mm) operating at 1400 rpm to separate out 13.0 kg of aqueous phase and 13.3 kg of solid phase (spent cossettes).

The solid phase, still containing about 8.0% of inulin and 65.7% of water, was washed with 16 kg of water and then pressed at 80° C. and 5 kg/cm$^2$ using a grape seed press yielding 22 kg of aqueous phase containing 3.9% of inulin, which was pooled with the aqueous phase separated out at the end of the leaching for subsequent purification, and 7.3 kg of the pressed solid phase containing 50% of water and negligible traces of residual inulin.

A portion of 5 kg of the aqueous phase originating from the leaching step held at 65° C. and containing 6.4% by weight of inulin was then filtered on a paper filter to remove suspended solid impurities. The filtrate so obtained was then concentrated by evaporation under vacuum (T=90° C., pressure=450 mbar progressively reduced to 150 mbar) in a Rotovapor until 80% by weight of the water had been removed. The concentrated solution so obtained was then subsequently crystallised recovering approximately 0.311 kg of inulin, corresponding to a total process yield of inulin with respect to the total inulin present in the roots of 90%.

The invention claimed is:

1. A process for obtaining inulin starting from roots of plants belonging to the Cardueae tribe, comprising the steps of:
    a) Comminuting said roots to obtain cossettes having maximum thickness of 1 cm;
    b) Leaching, by means of at least one cavitation treatment, inulin from said cossettes in presence of an aqueous solution;
    c) separating an aqueous phase, containing inulin, and a solid phase, containing exhausted cossettes; and
    d) purifying said aqueous phase containing inulin;
    wherein said cossettes are fed to said leaching step b) at ambient temperature; and wherein said step b) consists of leaching in a hydrodynamic cavitator, at a pressure in the range of 0.1-3.5 MPa, for a time of less than 60 minutes and with an aqueous solution having pH in the range of 5-9.

2. The process according to claim 1, further comprising before step a) one or more pretreatment steps of said roots, selected from the group consisting of:
    (i) topping;
    (ii) cleaning and screening;
    (iii) washing; and
    (iv) drying.

3. The process according to claim 1, wherein said step a) is performed at a temperature equal to or less than 90° C.

4. The process according to claim 1, wherein said step b) is performed at a temperature equal to or less than 90° C.

5. The process according to claim 1, wherein said step b) is performed using up to 15 parts by weight of aqueous solution per part of cossettes.

6. The process according to claim 1, wherein said step c) is performed by means of one or more operations selected from the group consisting of filtration, centrifugation, sedimentation, decantation, pressing, crushing, and any combination thereof.

7. The process according to claim 1, wherein the aqueous phase separated from step c) shows an inulin content between 3 and 18% by weight and the solid phase separated from step c) shows a water content equal to or less than 70% by weight.

8. The process according to claim 1, wherein said step d) is performed by means of one or more treatments selected from the group consisting of: carbonation, defecation, crystallization, centrifugation, filtration, microfiltration, nanofiltration, ultrafiltration, lyophilization, osmosis, decanting, refining and combinations thereof.

9. The process according to claim 2, wherein said step a) is performed at a temperature equal to or less than 90° C.

10. The process according to claim 2 wherein said step b) is performed at a temperature equal to or less than 90° C.

11. The process according to claim 3 wherein said step b) is performed at a temperature equal to or less than 90° C.

12. The process according to claim 2, wherein said step b) is performed using up to 15 parts by weight of aqueous solution per part of cossettes.

13. The process according to claim 3, wherein said step b) is performed using up to 15 parts by weight of aqueous solution per part of cossettes.

14. The process according to claim 4, wherein said step b) is performed using up to 15 parts by weight of aqueous solution per part of cossettes.

15. The process according to claim 2, wherein said step c) is performed by means of one or more operations selected from the group consisting of filtration, centrifugation, sedimentation, decantation, pressing, crushing, and any combination thereof.

16. The process according to claim 3, wherein said step c) is performed by means of one or more operations selected from the group consisting of filtration, centrifugation, sedimentation, decantation, pressing, crushing, and any combination thereof.

17. The process according to claim 4, wherein said step c) is performed by means of one or more operations selected from the group consisting of filtration, centrifugation, sedimentation, decantation, pressing, crushing, and any combination thereof.

18. The process according to claim 2, wherein the aqueous phase separated from step c) shows an inulin content between 3 and 18% by weight and the solid phase separated from step c) shows a water content equal to or less than 70% by weight.

19. The process according to claim 3, wherein the aqueous phase separated from step c) shows an inulin content between 3 and 18% by weight and the solid phase separated from step c) shows a water content equal to or less than 70% by weight.

20. The process according to claim 4, wherein the aqueous phase separated from step c) shows an inulin content between 3 and 18% by weight and the solid phase separated from step c) shows a water content equal to or less than 70% by weight.

* * * * *